F. E. ELLIS.
FABRIC FOR PRINTERS' BLANKETS AND OTHER PURPOSES.
APPLICATION FILED MAR. 21, 1917.

1,231,141.

Patented June 26, 1917.

Inventor.
Frank E. Ellis by Wright, Brown, Quinby & Ray
Attorneys

UNITED STATES PATENT OFFICE.

FRANK E. ELLIS, OF REVERE, MASSACHUSETTS.

FABRIC FOR PRINTERS' BLANKETS AND OTHER PURPOSES.

1,231,141. Specification of Letters Patent. Patented June 26, 1917.

Application filed March 21, 1917. Serial No. 156,290.

*To all whom it may concern:*

Be it known that I, FRANK E. ELLIS, a citizen of the United States, residing at Revere, in the county of Suffolk and State of Massachusetts, have invented new and useful Improvements in Fabrics for Printers' Blankets and other Purposes, of which the following is a specification.

The present invention relates to fabrics especially adapted for printers' blankets and therefore claimed herein as such a blanket; but adapted also for other purposes, wherefore my claim is not restricted in all respects to the specific article known as a printer's blanket when made from such fabric.

The novelty and structural features of the fabric, and the characteristics and advantages of a printer's blanket made therefrom, are fully set forth in the following specification, in connection with the drawings forming a part thereof.

In the drawings,—

The same reference characters indicate the same parts in all of the figures.

Figure 1:
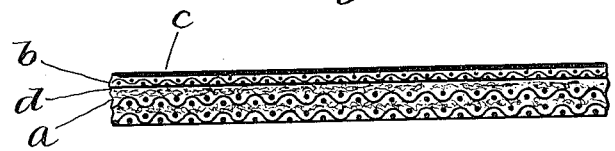
Figure 1 is a sectional view of a fabric or printer's blanket embodying the present invention.

The fabric or blanket which embodies the present invention consists of two principal structural elements, namely a base *a* and a face *b*. The base is preferably the so-called felt which has long been used as a blanket for packing the impression cylinders of news paper presses; but it may be of other construction or description, such as a rubber blanket so-called cork carpet or linoleum, or a woven or felted fabric of any sort. The term "felt" as used to designate printers' blankets and the fabrics therefor signifies a textile fabric in which the warp and weft strands or elements are of wool and the fibers of which on one surface are formed into a long nap which is beaten and pressed down so as to form a smooth surface similar to the surface of felt. On account of the fact that this fabric has a felt-like surface, it is called "felt," although actually it is a woven fabric and has much greater tensile strength than is possessed by true felt. Such fabric is also preferably made of two or more woven plies bound together in any manner known in the weaving art which is suitable for the purpose. In Fig. 1 of the drawings I have shown a two-ply woven fabric or blanket having a long nap on one face which is formed into a surface similar to that of felt, thus illustrating the common and well known so-called felt printer's blanket. This illustration is not to be understood as a limitation of the invention, however, or as excluding from the protection of the invention a base formed of any other sort of woven fabric or of one having the characteristics of linoleum, or one made as a rubber blanket; such rubber blankets being usually constructed of a number of plies of thin frictioned woven fabric vulcanized together and having a layer of film of rubber composition on one face.

The face layer *b* is also preferably of woven fabric comparatively thin, and ordinarily, although not necessarily, of cotton. On the outer face of the layer or fabric *b* is spread a coating *c* of a character adapted to repel printers' ink and fluids of like nature. The essential characteristics of such a coating, in order that the fabric provided therewith may be used as a printer's blanket, are smoothness, imperviability to oil, and lack of porosity. Various materials may be applied in a film or coating having these characteristics, among which are included nitro cellulose, preferably combined with an emollient such as a non-drying oil, preferably castor oil, to prevent the same from becoming stiff and brittle, metals of various kinds when deposited in fine particles, and other materials. From my experiments, I have found that nitro cellulose modified as above indicated, best serves my purpose and I therefore prefer to use that material as the substance of the coating *c*.

The face layer *b* is placed upon the felted surface of the base layer *a* when the latter is of the so-called felt construction, and is united thereto by an interposed film of adhesive, preferably a flexible oil-proof and water-proof cement. To describe this feature in technical language, the two layers are doubled together with adhesive preferably of the sort above indicated.

When the base of the blanket is of the so-called rubber blanket construction, the face layer *b* having the coating is doubled to that side of the rubber base whereon the fabric of the rubber blanket construction appears. That is, in the ordinary rubber blanket, one surface only is provided with a body of rubber of any appreciable thickness, and the opposite face is woven fabric with only so much rubber composition thereon as is applied in the process of frictioning. It is to the latter face or surface of a rubber blanket, when such is used as the base of my improved fabric, that I apply the herein described face layer.

Figure 2:
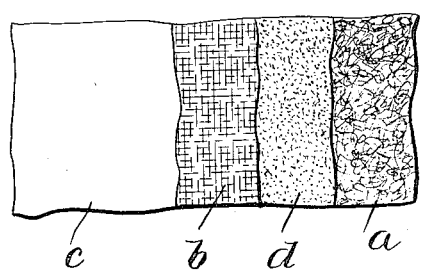
Fig. 2 is a plan view of a fragment thereof in which layers or elements are represented as being partially stripped off to disclose several elements of the fabric or blanket.

In Fig. 2, I have shown the successive layers and films of the combined fabric partly stripped off. Here $a$ represents the felted face of the body $a$, $d$ represents the film of cement or other adhesive by which the face layer $c$ is united to the base; $b$ represents the fabric portion of the face layer with the surface coating stripped therefrom, and $c$ represents the coating of nitro cellulose, metal, or whatever material may be used to make this coating.

A section of fabric made as above described, sufficient to provide a printer's blanket, is applied to the impression cylinder or bed of a printing press in such a manner that the coating $c$ is exposed on the outer surface and is the part of the blanket against which the paper bears when receiving the impression of the printing plates. This type of blanket is particularly useful for news paper work, and for other work in which cylinder presses are used and in which the opposite faces of the paper are printed upon in rapid succession. In this type of work, the side of the paper inked in the first impression is brought against the impression cylinder for the second impression before the ink of the first impression has had time to dry. When the blanket into contact with which the paper then comes has a surface to which ink will adhere, some of the ink from the first impression will be deposited on that blanket and will be transferred therefrom to subsequent sheets. This receiving of ink by the blanket and transferring it to other sheets is called "offsetting." In case the ink thus transferred to the blanket should not register with the impression on the sheets subsequently coming into contact with it, the ink thus offset to the subsequent sheets will appear on the surface thereof and give the appearance of a blurred impression.

The coating $c$ of my improved blanket having the qualities previously described of being smooth, non-porous and impervious, is also repellent to ink, wherefore the moist ink on the first impression of the paper will not adhere to it, and there will be no offsetting of the ink from one paper or sheet to the next. Thus this blanket has a non-offsetting face. This is one of the features of advantage of the present invention.

Another feature is this, that, in case the film or coating $c$ should become broken or cracked so that it is no longer impervious to ink and no longer smooth, the construction of the blanket, consisting as it does of a face layer doubled to a body, permits the face layer to be stripped from the body and a new face layer to be applied over the old body, thus practically renewing the blanket. Thereby a damaged face can be renewed at trifling expense while the same body is retained in use.

Another valuable feature is the film of oil-proof and water-proof cement $d$ which unites the face to the base of the blanket. Such film protects the blanket body against entrance of the very penetrating oil contained in printers' inks in cases where the surface coating $c$ becomes cracked or otherwise pervious and before the damage to the surface thereof from this cause becomes great enough to require renewal of the face. All printers' inks contain a large proportion of oil, which is the vehicle for the pigments used, and such oil very quickly penetrates through any opening, even the most minute. When it has access to the body of a felt blanket, the latter quickly becomes filled with oil and becomes spoiled. The protection thus afforded by the cement film $d$ causes oil to be completely excluded from the body and keeps the latter clean and enables it to be used longer without being soggy and dead. The total life of the body is also lengthened by the same means and for the same reason.

A further advantage resulting from my invention is that a blanket made in accordance therewith is less expensive to produce than those heretofore used because the provision of the face layer enables the body layer to be thinner and thus it need contain less of the expensive woolen yarn. Experience has shown that the felt blankets of printing presses must have a certain minimum thickness, and in practice the felt blankets used on news paper presses range from .060 to .110 of an inch. If the face layer has a thickness of .010 of an inch or thereabout, the felt body may be made thinner by that amount, wherefrom results a saving of the expensive material of the same of from 10% to 15%. The above figures are given for illustration and are not exclusive.

The same advantages follow from the application of my invention to a blanket in which the body is of textile fabric and rubber, that is has the construction usual in the so-called rubber blankets. Such rubber blankets are rapidly deteriorated when acted upon by oil, and are also expensive.

What I claim and desire to secure by Letters Patent is:

1. A printer's blanket, comprising a body, a face ply of textile fabric, a film of waterproof and oil-proof cement between said body and ply uniting the two together, and a smooth non-porous ink-repellent coating constructed as a film deposited on the outer side of said face ply.

2. A blanket for printing presses, comprising body and face layers, the former being of relatively expensive material and the latter of relatively inexpensive material, a film of adhesive material which is impervious to oil lying between said layers and connecting them together, and a non-offsetting film or coating adherently attached to the outer side of said face layer.

3. A printer's blanket comprising a body portion, a textile fabric secured by adhesive to one face of said body portion, and a film consisting essentially of nitrocellulose with a sufficient quantity of an emollient combined with it to render it flexible and non-brittle, united by deposition on the outer surface of said textile fabric.

In testimony whereof I have affixed my signature.

FRANK E. ELLIS.